(12) United States Patent
Bajpai

(10) Patent No.: US 9,111,329 B2
(45) Date of Patent: Aug. 18, 2015

(54) METHOD AND APPARATUS FOR COMPRESSING IMAGES

(71) Applicant: Samsung Electronics Co., Ltd., Gyeonggi-do (KR)

(72) Inventor: Pankaj Kumar Bajpai, Bangalore (IN)

(73) Assignee: Samsung Electronics Co., Ltd (KR)

( * ) Notice: Subject to any disclaimer, the term of this patent is extended or adjusted under 35 U.S.C. 154(b) by 295 days.

(21) Appl. No.: 13/727,195

(22) Filed: Dec. 26, 2012

(65) Prior Publication Data

US 2013/0163891 A1 Jun. 27, 2013

(30) Foreign Application Priority Data

Dec. 26, 2011 (IN) .............................. 4579/CHE/2011

(51) Int. Cl.
*G06K 9/36* (2006.01)
*G06T 9/00* (2006.01)

(52) U.S. Cl.
CPC ....................................... *G06T 9/00* (2013.01)

(58) Field of Classification Search
USPC .................................. 382/232, 233, 244–248
See application file for complete search history.

(56) References Cited

U.S. PATENT DOCUMENTS

| 5,677,689 | A | 10/1997 | Yovanof et al. |
|---|---|---|---|
| 6,356,668 | B1 | 3/2002 | Honsinger et al. |
| 7,260,265 | B2 | 8/2007 | Prakash et al. |
| 7,477,796 | B2 | 1/2009 | Sasaki et al. |
| 7,620,252 | B2 | 11/2009 | Mukherjee |
| 2007/0036451 | A1 | 2/2007 | Ando et al. |
| 2008/0050025 | A1 | 2/2008 | Bashyam et al. |
| 2008/0298702 | A1 | 12/2008 | Gunupudi et al. |
| 2009/0317007 | A1* | 12/2009 | Baipai et al. ................. 382/233 |

* cited by examiner

*Primary Examiner* — Duy M Dang
(74) *Attorney, Agent, or Firm* — The Farrell Law Firm, P.C.

(57) ABSTRACT

Disclosed is a method and apparatus for generating fixed size compressed images. The method includes grouping member entities of the image into a plurality of groups based on each image features, each of the plurality of groups including member entities sharing common features; selecting at least one group representative from at least one of the plurality of groups; estimating final control parameters for each of the group representatives in an iterative manner; and compressing the image based on the estimated control parameters.

20 Claims, 12 Drawing Sheets

METHOD AND APPARATUS FOR COMPRESSING IMAGES

PRIORITY

This application claims priority under 35 U.S.C. §119(a) to a Indian Patent Application filed in the Indian Patent Office on Dec. 26, 2011 and assigned Serial No. 4579/CHE/2011, the contents of which are incorporated herein by reference.

BACKGROUND OF THE INVENTION

1. Field of the Invention

The present invention relates generally to a method and apparatus for processing still digital images, and more particularly, to compressing such still digital images.

2. Description of the Related Art

Current image-capturing devices generally produce high-resolution images, which require large amounts of memory for storage and for processing. Images are compressed using suitable techniques.

When compressing an image, it is important to consider file size and the image quality of the compresses image. The compression technique used should be able to compress images to a much lower size, while preserving the quality at an acceptable level. Images are compressed using lossy or lossless compression techniques.

Image compression techniques use various tools such as block based Discrete Cosine Transform (DCT), Quantization and variable length encoding or Huffman encoding. In DCT, the image is separated into spectral sub-bands of differing importance with respect to the image's visual quality. DCT process transforms the data into different domains where much of the energy of signal/image block is concentrated to only few of the coefficients.

Quantization is an approximation technique where the dynamic range of the input data is reduced by down-scaling the input data magnitude using quantization matrices/factor. Hence, the output of quantization process is represented in a lesser number of bits.

Huffman encoding is a variable length encoding scheme, in which shorter codes are assigned to high-probability events and longer codes are assigned to low-probability events thereby reducing average bit rate. The file size of a compressed image is controlled by quantization matrices/tables and encoding techniques.

Generally, images are compressed as per an application's specification. The application specific compressed images are unsuitable for use in other applications. For example, Multimedia Messaging Service (MMS) application limits the images to be sent to some maximum file size of 300 KB. However, the original image may be captured with high quality and high-resolution, and hence, are much larger than defined limits.

Further, users can share images on the Internet by uploading their images on various image sharing applications such as Picasa, Smugmug and Flickr. As the image sharing applications have limited memory, the user may not be able to share many of their high-resolution images. Owing to such restrictions, the user is required to re-encode the images, so that he/she can maximize the number of images to be stored.

Aforementioned limitations have led to user modifying the images, based upon user's properties, and server storage limitations. An image's file size is modified by modifying the quantization table, which controls the file size by performing a trade-off between distortion and bit-rate. The quantization tables are constructed based upon the Human Visual System (HVS). The human eye is generally good at distinguishing brightness over a relatively large area, against the exact strength of a high frequency brightness variation. Therefore, the high frequency components are more quantized than low-frequency components, to reduce the amount of information.

Although multiple quantization tables are allowed in image compression techniques, some image standards do not allow quantization tables from one Minimum Coded Unit (MCU) to be used in other MCUs. Therefore, the quantization tables decided should be considered uniformly throughout the entire image.

At present, the file size of a compressed digital image is controlled by a variation of the quantization table or an application of scalar multipliers to reference quantization tables. The multipliers may be adjusted and image is re-encoded iteratively until a desired average bit rate is achieved. The number of the passes required for achieving the final rate at minimal distortion is completely image-dependent and hence computational complexity requirements are very high for practical implementations. Further, power source of the image-capturing device may be adversely affected. The computational complexity increases with increase in image resolution.

Various other quantization and perceptual rate distortion optimization techniques developed for Discrete Cosine Transform (DCT) based image codec include scaled quantization, spectral zeroing, and perceptual quantization table design. These methods attempt to estimate the quantization parameters by analyzing the image characteristics. However, some additional compression tools may be used to determine the final encoded file size. The existing methods do not handle such additional tools. The present compression techniques estimate image parameters, but do not provide a mechanism that validate whether the estimated parameters are actually sufficient to obtain the desired file size.

The present compression techniques estimate the parameters and enable compression to a predefined file size, but do not allow a user to vary the quantization parameters, and hence, determine the file size by selecting user's preference image quality factor.

SUMMARY OF THE INVENTION

Accordingly, the present invention is designed to address at least the problems and/or disadvantages described above and to provide at least the advantages described below. As such, an aspect of the present invention is to provide an image compression method and apparatus capable of compressing an image to have a predetermined file size.

Another aspect of the present invention is to provide an image compression method and apparatus capable of recompressing a compressed image to have a predetermined file size.

Another aspect of the present invention is to provide an image compression method and apparatus capable of simply compressing an image to have a predetermined file size by grouping member entities of the image based on image features.

Another aspect of the present invention is to provide an image compression method and apparatus capable of processing member entities of an image through grouping based on common features.

Another aspect of the present invention is to provide an image compression method and apparatus capable of processing member entities of an image through grouping based on a similarity criterion.

Another aspect of the present invention is to provide an image compression method and apparatus capable of enabling estimation of a target file with or without changing a resolution of an image.

In accordance with an aspect of the present invention, a method of compressing an image is provided. The method includes grouping member entities of the image into a plurality of groups based on each image features; selecting at least one group representative from at least one of the plurality of groups; estimating final control parameters for each of the group representatives in an iterative manner; and compressing the image based on the estimated control parameters.

In accordance with another aspect of the present invention, an apparatus for compressing an image is provided. The apparatus includes a grouping unit for grouping member entities of the image into a plurality of groups based on each image features; an estimation unit for selecting at least one group representative from at least one of the plurality of groups and estimating final control parameters for each of the group representatives in an iterative manner; and a conversion unit for compressing the image based on the estimated control parameters.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
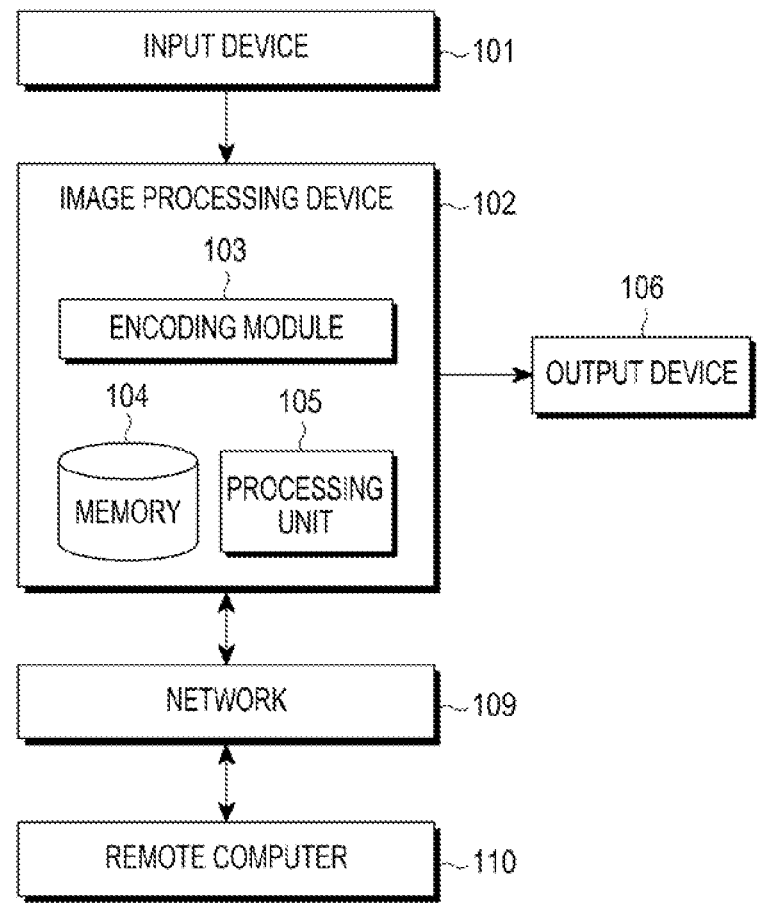
FIG. 1 illustrates architecture of image compression system, according to an embodiment of the present invention.

Hereinafter, embodiments of the present invention will be described with reference to the accompanying drawings. In the following description, the same elements will be designated by the same reference numerals although they are shown in different drawings. Herein, a detailed description of known functions and configurations incorporated herein will be omitted for the sake of clarity and conciseness.

The embodiments herein achieve a system and method for compressing a digital image represented by blocks of pixels into a pre-determined file size by performing multi-pass iterative estimation without processing the entire image.

Throughout the specification, the word "image" indicates any still digital image. The image may be present or saved in any format such as Joint Photographic Experts Group (JPEG), Tagged Image File Format (TIFF), Portable Network Graphics (PNG), Graphics Interchange Format (GIF), Windows bitmap (BMP (Microsoft Windows Device Independent Bitmap) file format) and so on. Digital devices such as mobiles, scanners, radar, cameras, and camcorders capture high-resolution digital images and save them on limited memory. The digital images have finite set of digital values that are represented by collection of Picture elements or Pixels. Pixels are the smallest individual element in an image that holds quantized values representing brightness of a given color at any specific point.

FIG. 1 illustrates the architecture of image compression system, according to an embodiment of the present invention. An image-processing device 102 includes a memory 104 and a processing unit 105 within an encoding module 103. The memory 104 stores captured images or any other visual content. The memory 104 may be a database for storing captured images or any other visual content. The processing unit 105 can fetch the captured images and process the images. The processing unit 105 determines pixels or resolution of the images; and divides into plurality of Minimum Coded Unit (MCU), for example. The images are transferred to the encoding module 103 corresponding to an image compression device where the images are encoded and recompressed. In an embodiment, encoding module 103 can directly receive at least one image captured by the input device 101 such as an image capturing device.

In an embodiment, the images are received from a digital camera which enables users to capture images and save them in digital format in the memory 104, where the digital camera may be a standalone device or be a part of another device such as a mobile device, a personal digital assistant and so on. The images to be recompressed are provided to the encoding module 103 through a mobile device, camera, database of the memory 104, memory, PDA, scanner, compact disks (CDs) or DVDs and so on. The images are recompressed by the encoding module 103 and are displayed on output such as screen/monitor, personal computer, a PDA, a mobile device, a digital picture frame and hardcopy printed from printers and so on.

In another embodiment, the image-processing device 102 can interact with at least a remote computer 110 over a network 109 such as the Internet. The network 109 is any wired or wireless communication network 109. The remote system is established to provide image services and products over the network 109, and includes of at least one image rendering facility and data centre. The image-processing device 102 system receives images from a data centre of the remote system over network 109. The images are delivered through e-mail from the remote system to the image recompression module 103 over the Internet for recompression. The image recompression module 103 processes and recompresses the receive images. The recompressed images are delivered and rendered on the remote system.

Figure 2:
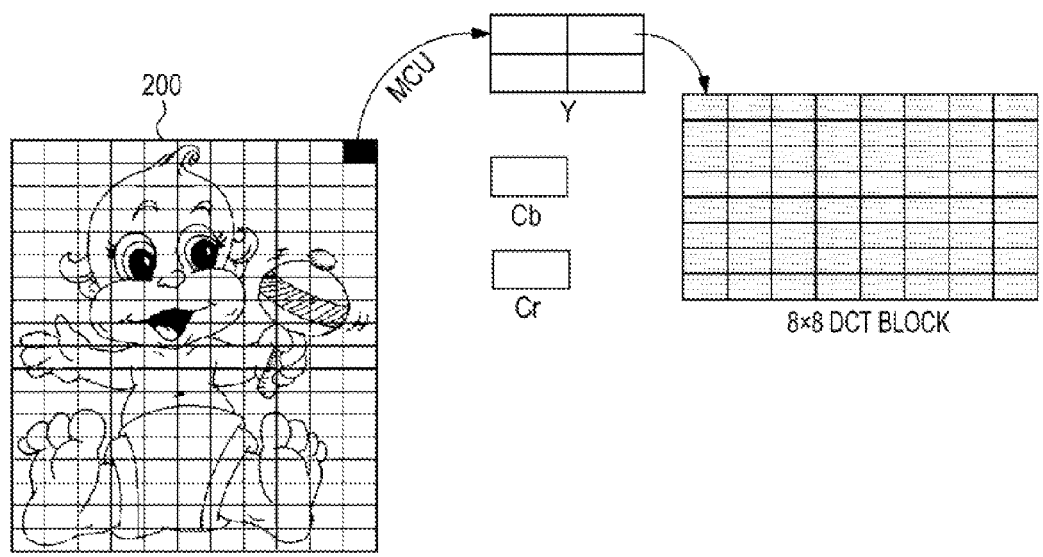
FIG. 2 illustrates the representation of an image and pixels ordering required for an image compression processing, according to an embodiment of the present invention.

FIG. 2 illustrates the representation of an image and pixels ordering required for an image compression processing, according to an embodiment of the present invention. The image is encoded as $YC_bC_r$ image where $YC_bC_r$ is a family of color spaces used as a part of the color image pipeline in digital photography systems. Y is the luminance component and $C_b$ and $C_r$ are the blue-difference and red-difference chroma components. As illustrated in FIG. 2, the image 200 is divided into pluralities of Minimum Coded Unit (MCU). The MCUs are a collection of set of pixels of each color channel. Each of the MCU is further divided into set of 8×8 tiled images and is referred to as "blocks" herein. The blocks are processed through Discrete Cosine Transformation (DCT) to the transformed DCT coefficients. The DCT expresses a sequence of many finite data points in terms of a sum of cosine functions oscillating at different frequencies and converts a signal into elementary frequency components.

Figure 3:
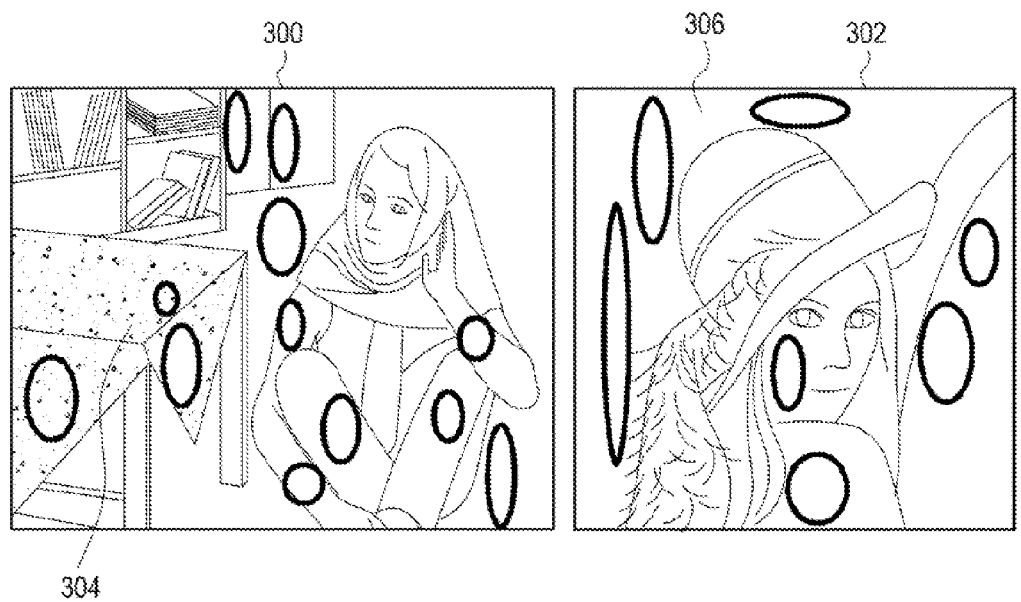
FIG. 3 illustrates similar areas available in an image, according to an embodiment of the present invention.

FIG. 3 illustrates similar areas available in an image, according to an embodiment of the present invention. The digital images can contain pluralities of sets of areas that share common features. FIG. 3 provides a set of two images 300 and 302 and each image displays a set of areas sharing at least one common feature denoted by circles. The set of areas sharing common features are grouped together. For example, a tablecloth 304 located at a different area on the first image 300 of FIG. 3 has the same $YC_bC_r$ values and thus, the areas of the tablecloth 304 can have common features and be considered a match. The set of areas having similar features, that is, the set of areas having common feature(s) are grouped together, as they are considered a match herein. Similarly, background 306 of the second image 302 of FIG. 3 has the same $YC_bC_r$ values and thus, the set of areas having similar features of the background 306 are grouped together.

In an embodiment, a system and method are provided to define the areas in an image and their common properties. The areas having common defined properties in the image such as the tablecloth 304 in first image 300 and the background 306 in the second image 302 of FIG. 3 are grouped together. The set of features $\{F_i\}$ of all the MCUs of the image are calculated. Furthermore, pluralities of groups $\{G_m\}$ may be formed with the MCUs satisfying the following expression in Equation (1):

$$MCU_j \in G_m \text{ iff } \{F_i\}_j = \{F_i\}_m, \forall i \quad (1)$$

where $MCU_j$ represents the $j^{th}$ MCU under consideration, $G_m$ is the $m^{th}$ group, "i" represents the $i^{th}$ feature element, $\{F_i\}_j$ represents the set of feature elements identified for $j^{th}$ MCU, $\{F_i\}_m$ represents the set of feature elements of $m^{th}$ group. Group of members sharing common features is processed through some defined process to produce similar results.

Figure 4:
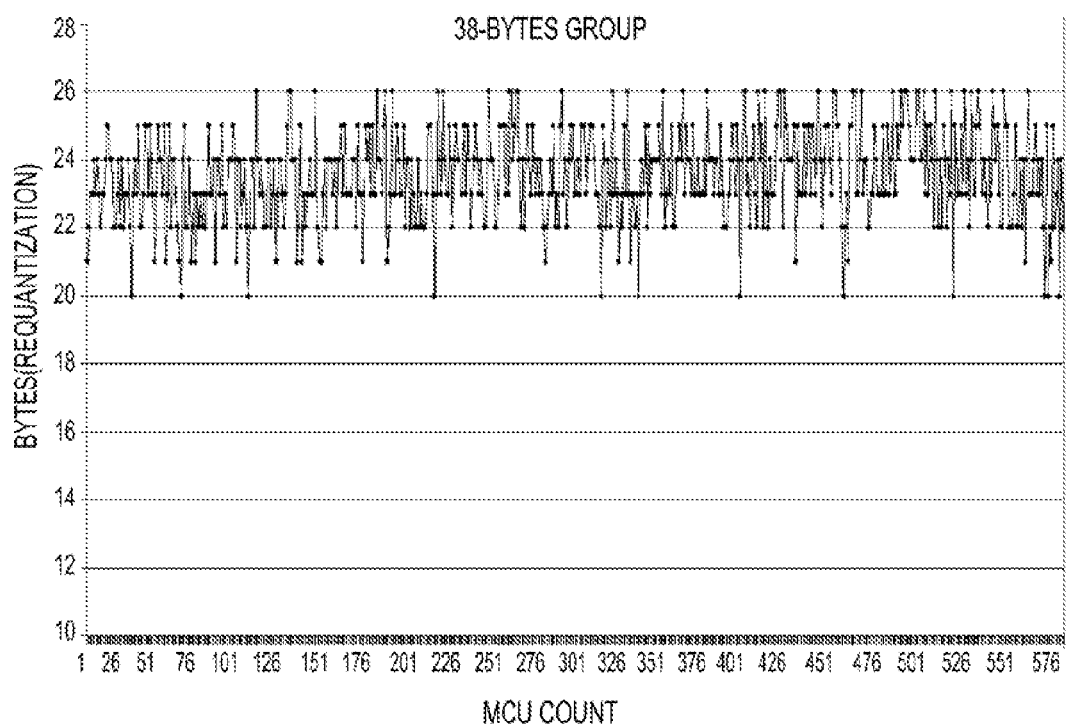
FIG. 4 illustrates a resultant size of each encoded MCU of a group formed by MCUs having encoded size of 38 bytes in first image of FIG. 3, according to an embodiment of the present invention.

FIG. 4 illustrates a resultant size of each encoded MCU of a group formed by MCUs having encoded size of 38 bytes in first image 300 of FIG. 3, according to an embodiment of the present invention. FIG. 4 depicts an experimental result that each encoded MCU of a group formed by MCUs having encoded size of 38 bytes in first image 300 and requantized by quantization table different from the original results in a similar output when processed, although with some amount of deviation.

Figure 5:
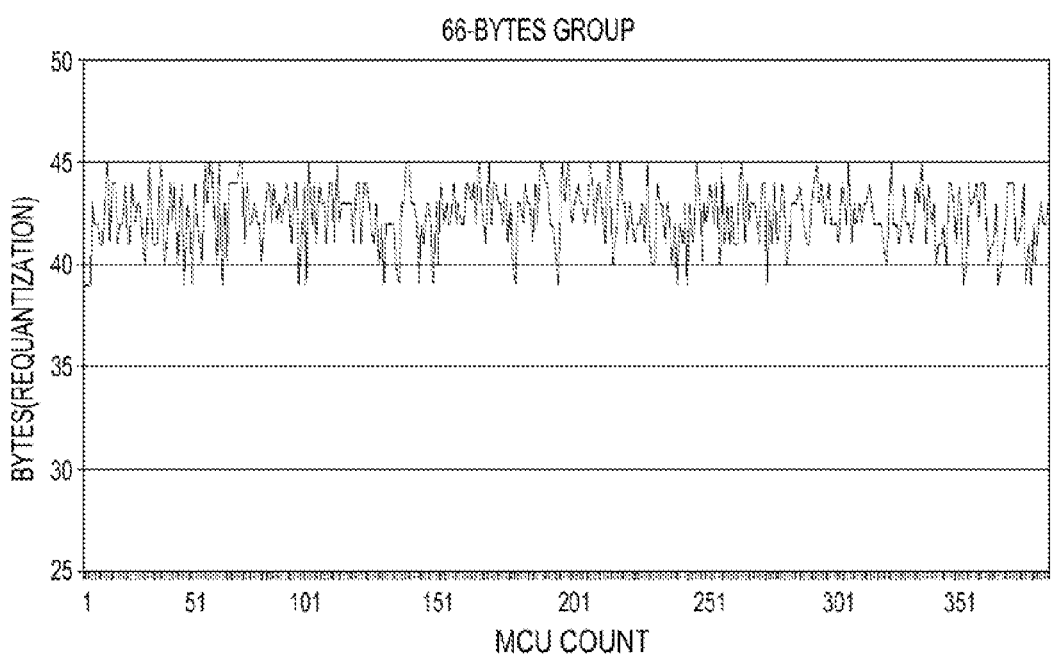
FIG. 5 illustrates a resultant size of each encoded MCU of a group formed by MCUs having encoded size of 66 bytes in first image of FIG. 3, according to an embodiment of the present invention.

FIG. 5 illustrates a resultant size of each encoded MCU of a group formed by MCUs having encoded size of 66 bytes in first image 300 of FIG. 3, according to an embodiment of the present invention. FIG. 5 depicts experimental result that each encoded MCU of a group formed by MCUs having encoded size of 66 bytes in first image 300 of FIG. 3 and re-quantized by different quantization table results in similar output when processed, although with some amount of deviation.

Figure 6:
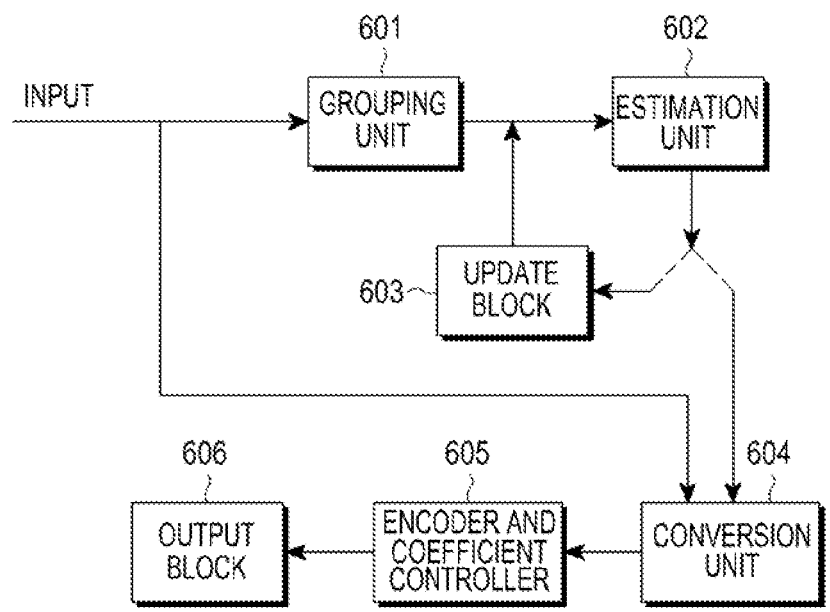
FIG. 6 illustrates an encoding module for encoding images to have a fixed size without change in dimensions, according to an embodiment of the present invention.

FIG. 6 illustrates an encoding module for encoding images to have a fixed size without a change in dimensions, according to an embodiment of the present invention. In FIG. 6, an image is recompressed into a pre-determined file size without changing the resolution of the image. The image to be recompressed is provided as an input to a Grouping Unit (GU) 601, which decodes the input image and forms groups of areas having similar properties. The groups formed are passed to an Estimation Unit (EU) 602, which performs iterative estimation on the groups for proper compression parameters, by using the updated estimation compression parameters received from update block 603.

A Conversion Unit (CU) 604 performs the final re-compression using the original input image and the final estimation control parameters from EU 602. The CU 604 calculates updated DCT coefficients for the image and passes the updated DCT coefficients to encoder and coefficient controller 605, which can encode the updated DCT coefficients using encoding techniques such as Variable-Length Code (VLC). The VLC maps source symbols to a variable number of bits and allows sources to be compressed and decompressed with zero error. During VLC encoding, the fine-bit rate control is achieved through varying the number of DCT coefficients actually getting encoded. The compressed image is obtained at the output block 606.

In an embodiment, recompression system comprising plurality of units such as Grouping Unit (GU) 601, Estimation Unit (EU) 602, A Conversion Unit (CU) 604, encoder and coefficient controller 605 are present in a system such as an image-capturing device, laptop, desktop or a Personal Data Assistant (PDA).

In another embodiment, at least one of the units of the recompression system is present in another system that is remotely located.

In another embodiment, a recompression method is achieved by a cloud computing mechanism. However, it may be noted that a person having ordinary skill in the art can utilize any of the mentioned embodiments or the like to achieve recompression of the images.

Figure 7:
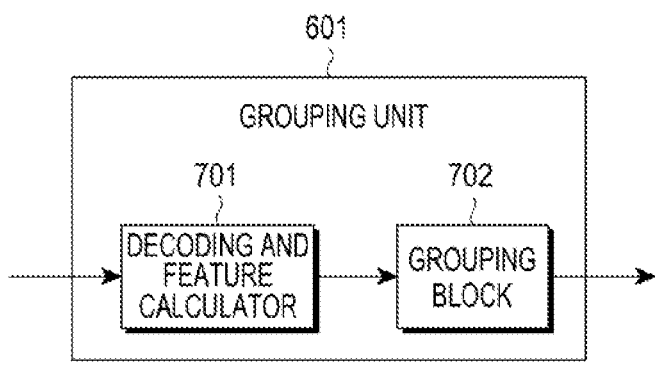
FIG. 7 illustrates a grouping unit, according to an embodiment of the present invention.

FIG. 7 illustrates GU, according to an embodiment of the present invention. The GU 601 includes a decoding and feature calculator 701 and grouping block 702. The decoding and feature calculator 701 performs the VLC decoding on the input image and computes the values of required feature sets {Fi} of all the member entities (MCUs) of the image. The computed feature sets of all the MCUs of the image are passed to grouping block 702, which analyzes all feature sets and creates Groups (G) of member entities having similar feature sets values, that is Groups (G) of member entities sharing common features.

Figure 8:
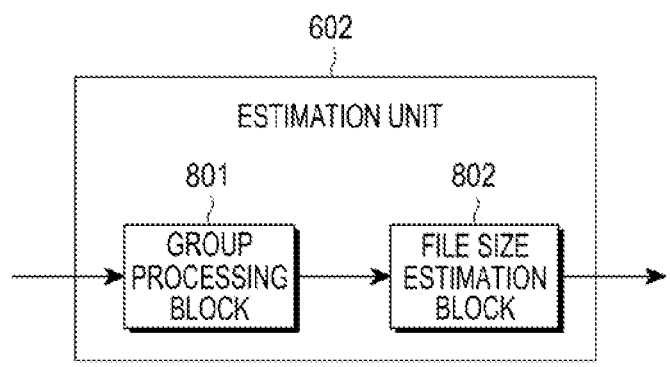
FIG. 8 illustrates an estimation unit, according to an embodiment of the present invention.

FIG. 8 illustrates an EU, according to an embodiment of the present invention. The EU 602 includes group processing block 801 and file size estimation block 802. The group processing block 801 receive groups from the GU 601. Each group is processed and one or more member-entities are selected as a Group-Representative (GR) to represent the group-behavior for processing. In an embodiment herein, GRs may not be selected from all groups.

The group processing block 801 performs the estimation of the proper compression parameters such as Quantization tables. The estimated compression parameters are passed to the file size estimation block 802. The file size estimation block 802 estimates file size of image. The estimated file size value is passed to update block 603 which passes the value again to group processing block 801 for further processing with update file size values. In each iteration, the estimation unit 602 process each of the GR(s) based upon defined procession function of group processing block 801 and then estimate the resulting file size in file size estimation block 802 using following expression in Equation (2):

$$fsz' = \sum_{i}^{feathers} \sum_{m}^{grp} \sum_{k}^{rep} f(\{F'_i\}_{mk}, GR_{mk}, FRQ_m)_{\{SQZP\}} \quad (2)$$

where fsz' is the estimated files size, f( ) is a function which can define the relation between the estimated file size and input parameters, FRQm is strength or weight of the mth group, and squeeze parameter, SQZP is the control parameter set, such as quantization tables.

Figure 9:
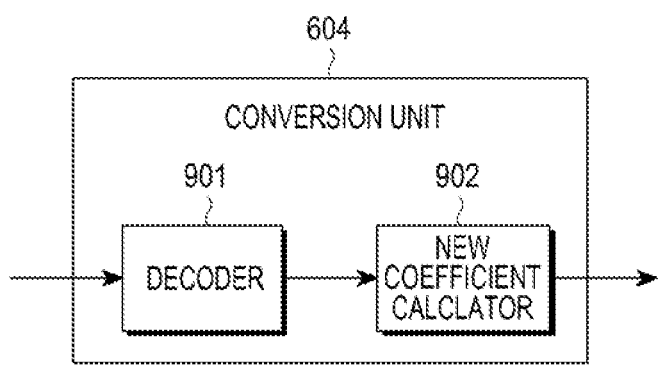
FIG. 9 illustrates a conversion unit, according to an embodiment of the present invention.

FIG. 9 illustrates a CU, according to an embodiment of the present invention. The CU 604 includes a decoder 901 and a new coefficient calculator 902. The decoder 901 decodes the data by inverse VLC in order to obtain DCT coefficients. The magnitude of decoded DCT coefficients is re-scaled based upon the original control parameters and new-estimated control parameters. The CU 604 performs the final re-compression using the input image and the final estimated control parameters (SQZP).

Figure 10:
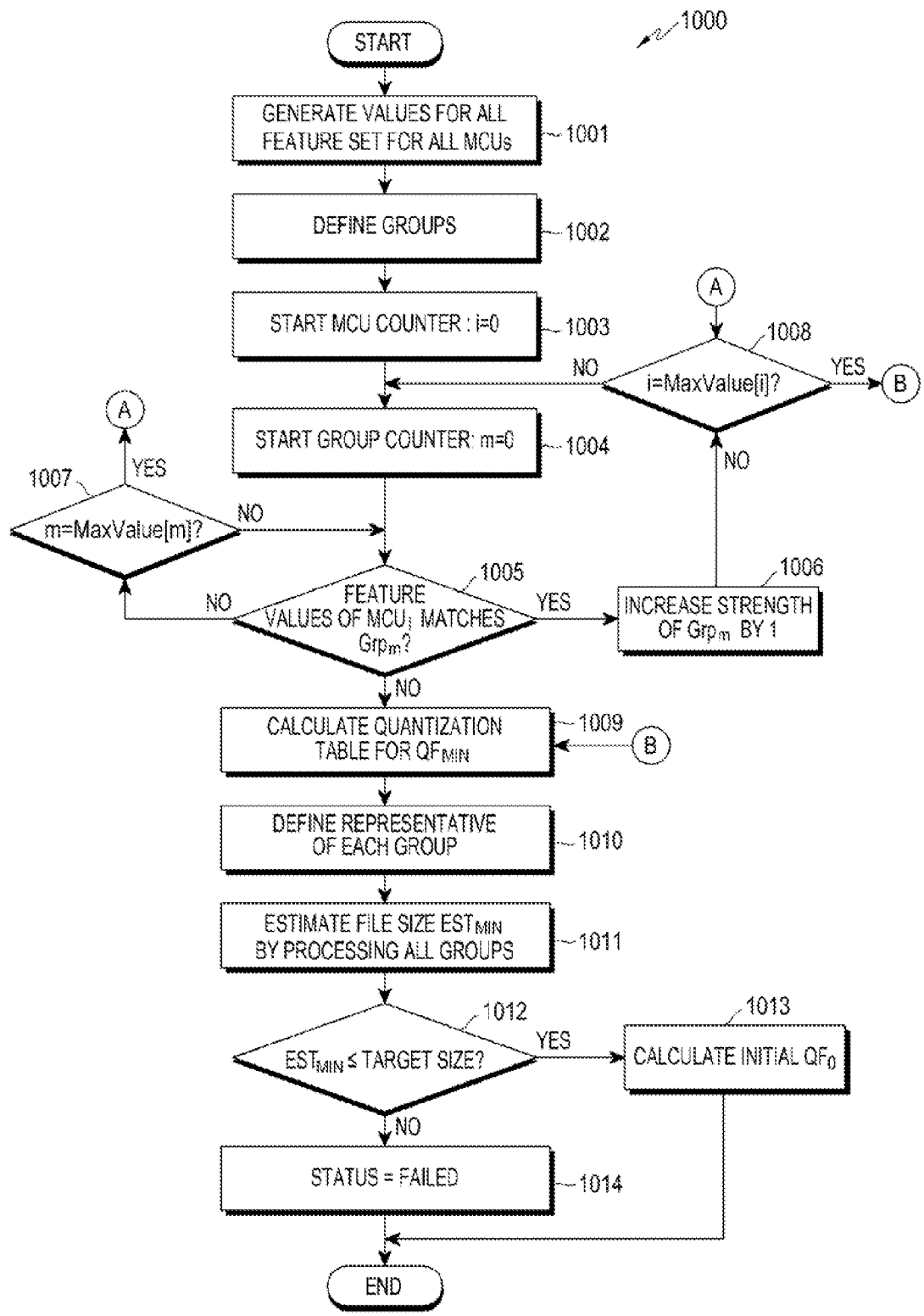
FIG. 10 depicts a process for fixed size encoding of images without change in dimension, according to an embodiment of the present invention.

FIG. 10 depicts processing for fixed size encoding of images without change in dimension, according to an embodiment of the present invention, and is a flowchart according to the embodiment of FIG. 6. The value of all the feature sets of all the MCUs of an image IS calculated (1001). Once the required values of feature sets of all the MCUs are computed, different distinctive groups are defined (1002) based upon the feature values obtained. The MCUs are considered one-by-one starting from first MCU in the defined order according to an MCU counter i (1003). For each MCU$_i$, starting from the first group in a defined order according to a group counter m (1004), each group Grp$_m$ is examined (1005) until the matching criterion defined by expression of Equation (1) is not met.

If a matching criterion is not met (1007) in a group, a next group is checked for matching criterion until maximum value (MaxValue[m]) is reached. When a proper match is found, the respective MCU is placed under the matched group and the strength/weight of the group is increased (1006). All the groups are examined to identify all the matching groups. Further, once all the groups in a MCU are processed, next MCU may be selected (1008) and processed by iterating the steps (1004), (1005) and (1007). All the MCUs are processed until a maximum value (MaxValue[i]) is reached. The process may finish when all the MCUs are grouped. A quantization table is used as the controlling parameter and the iteration is performed by varying the reference quantization table based upon the Quality Factor (QF). The quantization table corresponding to defined MINimum QF (QF$_{MIN}$) is computed (1009). The representative(s) of each group is defined (1010) and may represent the group for any reference. The available group representatives GRs are processed through a defined processing function such as image encoding of representative in complete or partial form.

The file size is estimated (1011) according to the expression of Equation (2). The estimated file size corresponding to QF$_{MIN}$ is denoted by EST$_{MIN}$, and is checked (1012) against a defined target file size of the image. If the EST$_{MIN}$ is less than or equal to the desired file size, then an initial Quality Factor (QF$_0$) and the corresponding quantization table is determined (1013). If the EST$_{MIN}$ is larger than desired file size, then the re-compression to desired file size may not be possible with acceptable quality, and the process can terminate with the failure status (1014). The method 1000 may be performed in the order presented, in a different order or simultaneously. In some embodiments, some actions listed in FIG. 10 may be omitted.

Figure 11:
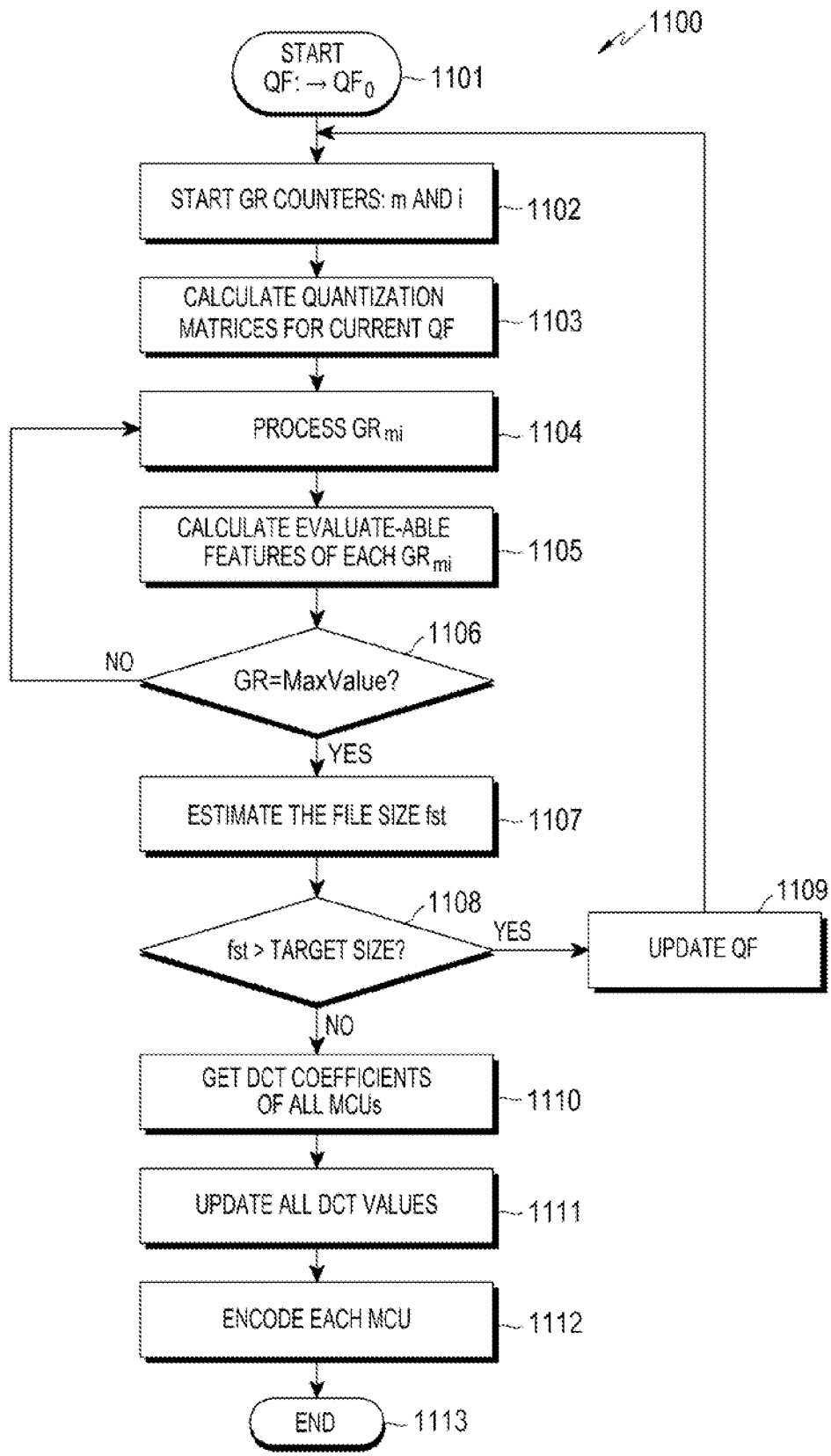
FIG. 11 depicts a process for iterative estimation and final re-compression of fixed size images encoded without change in dimension, according to an embodiment of the present invention.

FIG. 11 depicts a process for iterative estimation and final re-compression of fixed size images encoded without change in dimension, according to an embodiment of the present invention. Once QF$_0$ and the corresponding quantization table are determined after successful termination of initialization process (1000) of FIG. 10, the iterative estimation and final re-compression is performed and QF$_0$ is determined (1101). GR counters, that is, the GR counter m and the MCU counter i are started to process all the available group representatives GRs (1102) and the quantization tables are prepared (1103) based upon the current QF. The group representatives GR$_{mi}$ are processed (1104) through a defined processing function using the quantization tables. A new evaluate-able feature value is calculated (1105) from the outcome of (1104). The method performs a check (1106) to determine whether all the group representatives are processed (i.e., whether GR is a Max Value). If all the group representatives are not processed, steps (1104) and (1105) are repeated until all the group representatives are processed.

The new file size is estimated (1107) based upon the results obtained from the processing of all GRs and using the expression of Equation (2). The estimated file size "fst" is compared (1108) with target file size for adequacy. If the estimated file size "fst" is larger than the desired file size, the QF value is updated (lowered if "fst" is higher) to a new value (1109). For example, if the value of fst is higher than the desired file size, the value of QF is lowered and updated. The update QF value is returned to step (1102) for a next iteration in which all the group representatives GRs are processed again and new quantization tables are prepared (1103). In an embodiment, if the estimated file size "fst" is equal to or less than target file size, a final-recompression is performed. DCT coefficients of all MCUs (one by one) are obtained (1110) and the DCT coefficients values are updated (1111) by a final-estimated QF value. The updated DCT coefficients values are encoded (1112) using VLC encoding. In another embodiment, the estimation errors impact on file size is avoided by performing finer bit-rate control where the number of DCT coefficients that will undergo the encoding process is determined based upon current bit-rate and desired bit-rate.

The process of re-compression (1110), (1111) and (1112) is explained with respect to an optimized re-compression, but it should be understood that this is merely an example, and any other process/method may be used which can convert the input image to another image using the quantization table derived from iteration steps.

The method 1100 may be performed in the order presented, in a different order or simultaneously. Further, in some embodiments, some actions listed in FIG. 11 may be omitted.

Figure 12:
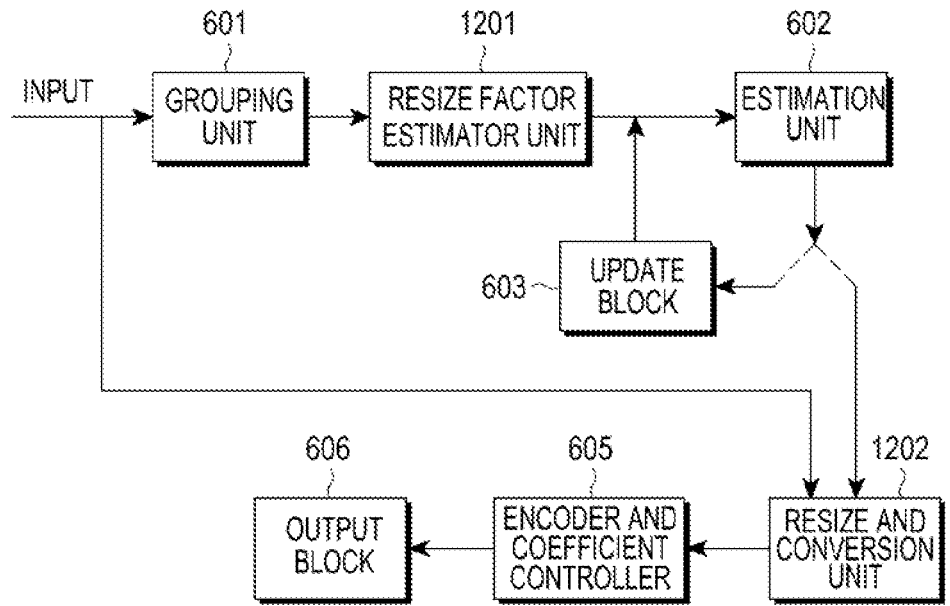
FIG. 12 illustrates an encoding module for encoding images to have a fixed size with change in dimensions, according to an embodiment of the present invention.

FIG. 12 illustrates an encoding module for encoding images to have a fixed size with change in dimensions, according to an embodiment of the present invention. In an embodiment, an image is recompressed into a pre-determined file size with change in the resolution of the image. The image to be compressed is provided as an input to the GU 601, which decodes the input image and forms groups of areas having similar properties. The groups formed are passed to Resize Factor Estimator Unit (RFEU) 1201. The RFEU 1201 can compute the required down-size factor (i.e. resize factor) in order to achieve the desired file size. The desired file size is updated to a new desired file and the new desired file size is passed to EU 602, which performs iterative estimation on the groups for proper compression parameters. The EU 602 performs iteration by using the updated estimation compression parameters received from update block 603. The EU 602 uses the new desired file size for quantization table (or QF) estimation.

Resize and Conversion Unit (RCU) 1202 performs the final re-compression using the input image and the final estimation control parameters from EU 602. The RCU 1202 calculates updated DCT coefficients for the image and passes the updated DCT coefficients to the encoder and coefficient controller 605, which encodes the updated DCT coefficients using encoding techniques such as Variable-Length Code (VLC). The VLC maps source symbols to a variable number of bits and allows sources to be compressed and decompressed with zero error. During VLC encoding the fine-bit rate control is achieved through varying the number of DCT coefficients that will undergo encoding. The image compressed is obtained at the output block 606.

In an embodiment, recompression system comprising plurality of units such as GU 601, RFEU 1201, EU 602, CU 604, RCU 1202 and encoder and coefficient controller 605 is present in a system such as an image-capturing device, laptop, desktop, or a PDA.

An embodiment of the present invention is implemented on a distributed computing system, where at least one of the units of recompression system is present in another system that is remotely located.

In another embodiment, recompression method is achieved by cloud computing mechanism. However, it may be noted that a person having ordinary skill in the art can utilize any of the mentioned embodiments or the like to achieve recompression of the images.

Figure 13:
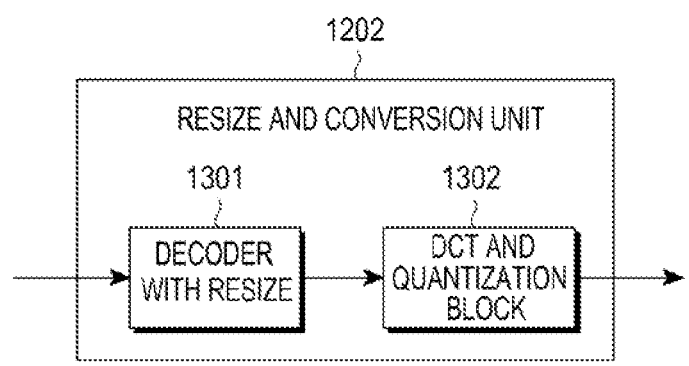
FIG. 13 illustrates resize and conversion unit, according to an embodiment of the present invention.

FIG. 13 illustrates resize and conversion unit, according to an embodiment of the present invention. The resize and conversion unit (RCU) 1202 includes a decoder with resize 1301 and a DCT and quantization block 1302. The decoder with resize 1301 can decode the data with a resize factor by inverse VLC in order to obtain DCT coefficients. The DCT and quantization block 1302 decodes the data and converts the data to the form acceptable for VLC encoding as per image compression by performing DCT and quantization.

Figure 14:
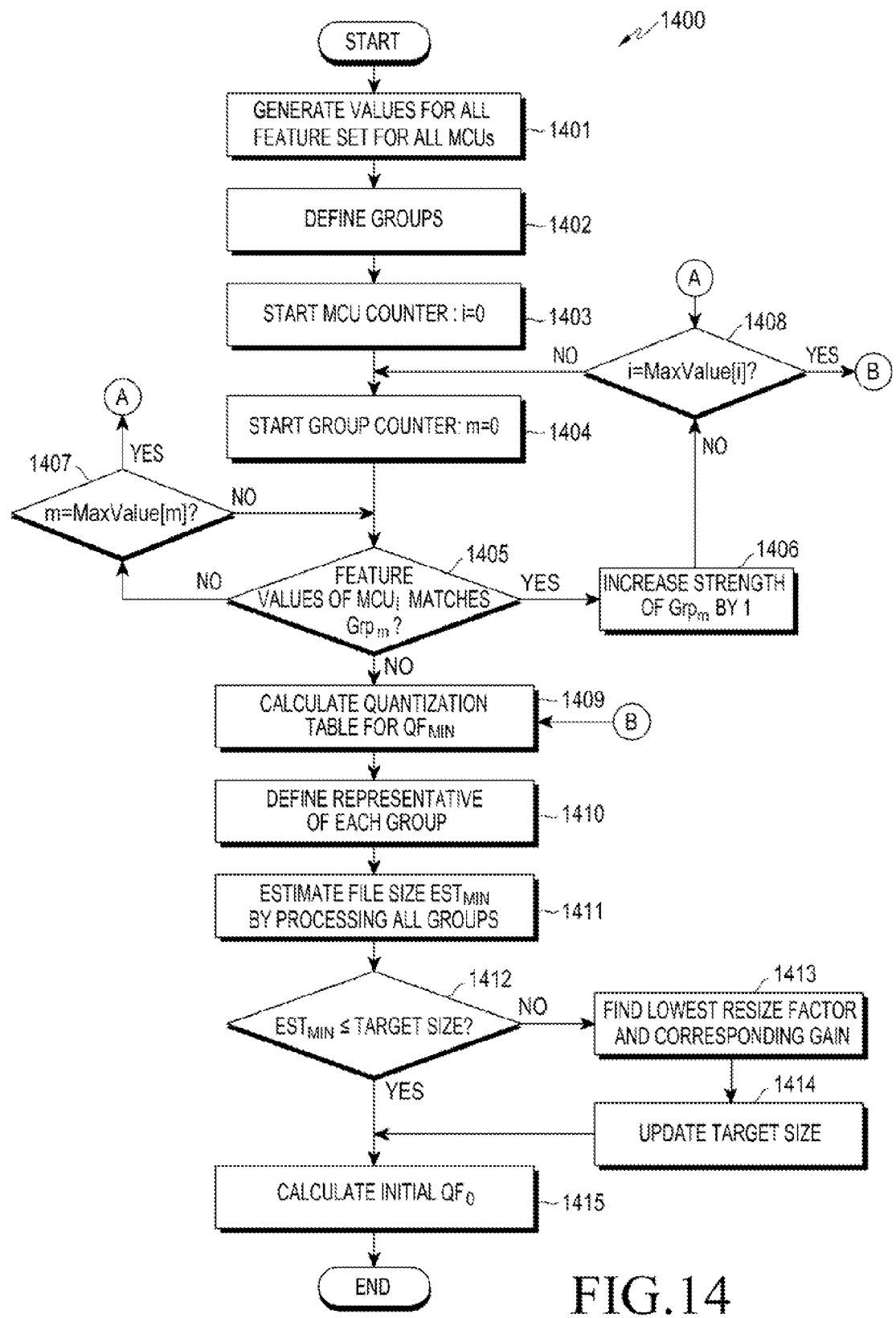
FIG. 14 depicts a process for fixed size encoding and resize estimation of images with change in dimension, according to an embodiment of the present invention.

FIG. 14 depicts a process for fixed size encoding and resizes estimation of images with change in dimension, according to an embodiment of the present invention, and is flowchart according to the embodiment of FIG. 12. The value of all the feature sets of all the MCUs of an image is calculated (1401), and different distinctive groups are defined (1402) based upon the feature values obtained. The MCUs are considered one-by-one starting from first MCU in the defined order according to the MCU counter i (1403). For each MCU, starting from first group in a defined order according to the group counter m (1404), all the groups $Grp_m$ are examined (1405) until the matching criterion defined by the expression of Equation (1) is not met. If a matching criterion is not met (1407) in a group, a next group is checked for matching criterion until maximum value (MaxValue[m]) is reached. When a proper match is determined, the respective MCU is placed under the matched group and the strength/weight of the group is increased (1406).

All the groups are examined to identify the matching group. When a matching group is found for the current MCU, a next MCU is selected (1408) and processed by repeating steps (1404), (1405) and (1407). All the MCUs are processed until a maximum value (MaxValue[i]) is reached. The process ends when all the MCUs are grouped. The quantization table is used as the controlling parameter and the iteration is performed by variation of the reference quantization table based upon the Quality Factor (QF). The quantization table corresponding to defined $QF_{MIN}$ is computed (1409). The representative(s) of each group is defined (1410), and can represent the group for any reference.

The available group representatives GRs are processed through a defined processing function such as image encoding of representative in complete or partial form. The file size is estimated (1411) according to the expression of Equation (2). The estimated file size corresponding to $QF_{MIN}$ is denoted by $EST_{MIN}$. The $EST_{MIN}$ is checked (1412) against defined target file size of the image. If the $EST_{MIN}$ is less than or equal to the desired file size, then an initial quality factor ($QF_0$) and the corresponding quantization table are determined (1415). If the $EST_{MIN}$ is larger than desired file size, then a lowest resize factor, that is, a lowest down-size factor and a corresponding gain are computed (1413). That is, the lowest resize factor for which the estimated file size best matches the target is found, and the gain for updating the bit-budget is computed for the determined lowest resize factor. For the down-size factor computation, a set of Downsize Factors {D1, D2 . . . DN}, Compression Gain-Factors {CG1, CG2 . . . CGN} and Amplification Factors {AF1, AF2 . . . AFN} are used. The set {CG1, CG2 . . . CGN} represents the typical compression gains that are achieved when an image is downsized by corresponding factor from the set {D1, D2 . . . DN}. The set {AF1, AF2 . . . AFN} represent the order by which if desired file size is increased, the downsized image is generated with at-most original desired file size. The downsize factor "Di" is selected from the set {D1, D2 . . . DN} if the following two conditions are satisfied:

(a) $EST_{MIN} \leq$ (Original Desired file size*$CG_i$), and (b) $D_i$ is the least downsize factor among the member of the set that satisfies (a).

Next, the target size is updated (1414). In other words, the original desired file size is updated to a new desired file size where New desired file size=(Desired file size*$AF_i$).

The corresponding gain which is represented as a compression gain factor is defined as an "after compression size/before compression size", and "$AF_i$" is considered ideally as 1/CG.

The new desired file size is used for the estimation of quantization table or QF. Thus, the estimation process can essentially occur in the original image dimension with the amplified target file size.

The method 1400 may be performed in the order presented, in a different order or simultaneously. Further, some actions listed in FIG. 14 may be omitted.

Figure 15:
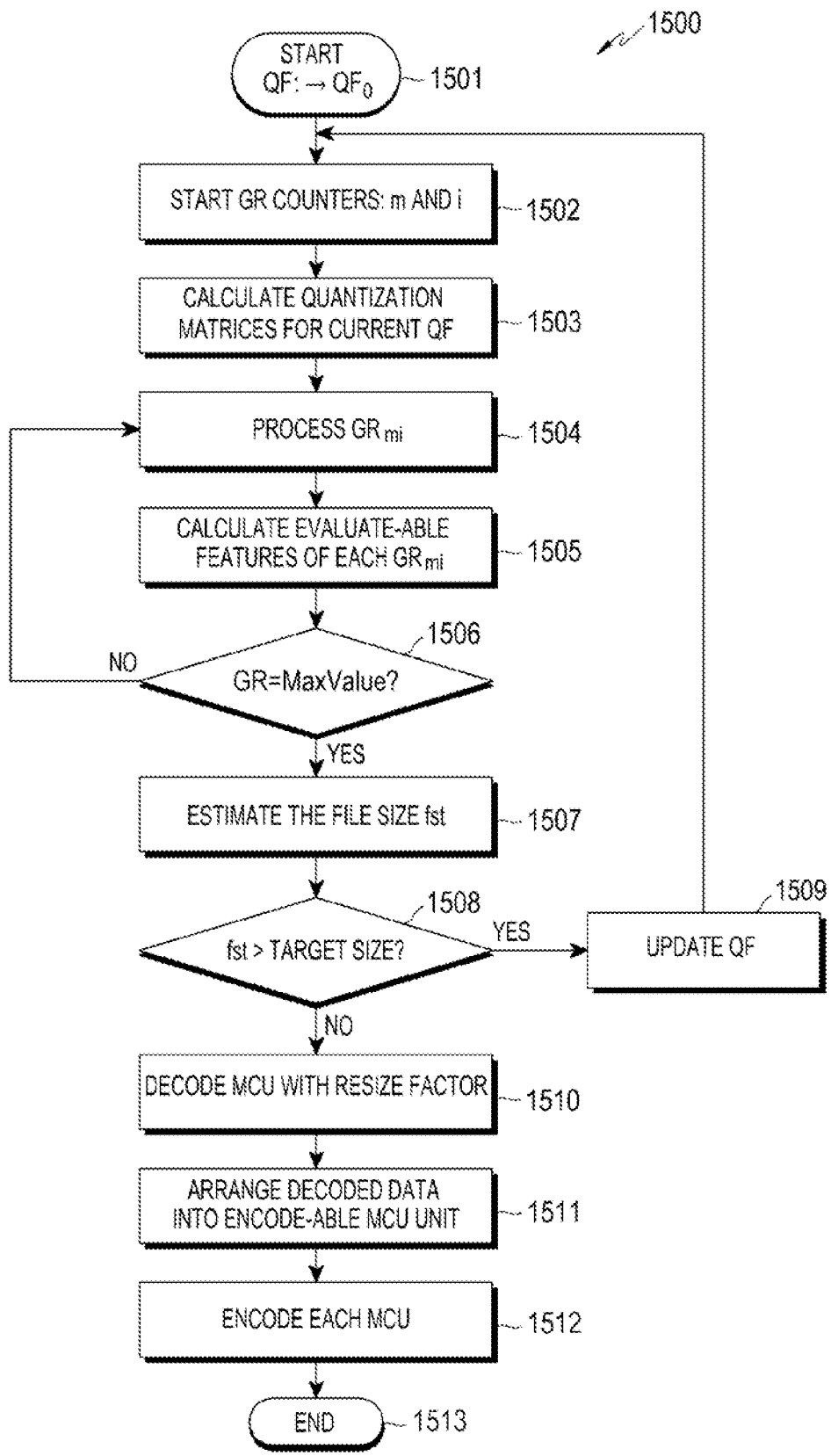
FIG. 15 depicts a process for iterative estimation and final re-compression of fixed size images encoded with change in dimension, according to an embodiment of the present invention.

FIG. 15 depicts a process for iterative estimation and final re-compression of fixed size images encoded with a dimension change, according to an embodiment of the present invention. Once QF0 and the corresponding quantization table are determined after successful termination of initialization process (1400) of FIG. 14, the iterative estimation and final re-compression is performed and Initial quality factor (QF$_0$) is determined (1501). The GR counters, that is, the group counter m and the MCU counter I are started to process all the available group representatives GRs (1502) and the quantization tables are prepared (1503) based upon the current QF. The group representatives GR$_{mi}$ are processed (1504) through a defined processing function using the quantization tables. A new evaluate-able feature value is calculated (1505) based on the outcome of (1504). The method performs a check (1506) to determine whether all the group representatives are processed.

If all the group representatives are not processed, steps (1504) and (1505) are repeated until all the group representatives are processed. The new file size is estimated (1507) based upon the results obtained from the processing of all GRs and using the expression in Equation (2). The estimated file size "fst" is compared (1508) with a target file size for adequacy. If the estimated file size "fst" is larger than the desired file size, the QF value is updated (lowered if "fst" is higher) to a new value (1509). For example, if the value of fst is higher than the desired file size, the value of fst is lowered and updated. The update QF value is returned to step (1502) for a next iteration in which all the GRs are processed again and new quantization tables are prepared (1503).

In an embodiment, if the estimated file size "fst" is less than or equal to the target file size, the final-recompression is performed. First, the encoded MCU is decoded into downsized raw data by applying the desired resize factor (1510). For example, if a size of the MCU is 16\*16 and the downsize factor is 2, the MCU is decoded into raw data having a size of 16\*16 and then decoded into raw data having a size of 8\*8. During the decoding, a downsize technique (such as downsize in DCT or transform domain) is applied. Accordingly, a size of the desired decoded raw data is 8\*8. The decoded raw data is received (1510) with the required dimension and is arranged (1511) into an encode-able MCU unit. The data is encoded (1512) as per compression techniques with the quantization table estimated in iterative-estimation. In another embodiment, the impact of estimation errors on file size is avoided by performing finer bit-rate control where the number of DCT coefficients actually participating in the encoding process is determined based upon current bit-rate and desired bit-rate.

The process of re-compression (1510), (1511) and (1512) is explained with respect to a resize and recompression method, but it should be understood that this is merely an example, and any other process/method may be used which can produce the desired image using the quantization table derived from the explained steps.

The method 1500 may be performed in the order presented, in a different order or simultaneously. Further, some actions listed in FIG. 15 may be omitted.

In another embodiment herein, resizing may be performed in the transform domain, followed by rescaling the coefficients and then encoding.

In another embodiment, an uncompressed image is compressed to a desired file size. For example, an image captured from a camera, which may be an uncompressed image, is compressed to a desired file size in a process described in aforementioned embodiments. The final re-compression can involve any embodiment such as compressing with resize or without resizing, depending upon a requirement.

In another embodiment, the grouping of areas/entities is based upon a "similarity" criterion, for example, which is defined as at least one of the least Mean Square Error (MSE), least Sum of Absolute Difference (SAD), an encoded length of the MCU, and a DCT coefficient distribution, for example.

The MSE is defined as in Equation (3) as follows:

$$MSE = \frac{1}{NM} \sum_{x=0}^{N-1} \sum_{y=0}^{M-1} (A(x + O_{X1,y} + O_{Y1}) \cdot A(x + O_{X2,y} + O_{Y2}))^2 \quad (3)$$

and least SAD is defined in Equation (4) as:

$$SAD = \sum_{x=0}^{N-1} \sum_{y=0}^{M-1} |A(x + O_{X1,y} + O_{Y1}) - A(x + O_{X2,y} + O_{Y2})| \quad (4)$$

where N: number of pixels in a row; M: number of pixels in a column; A(x, y): Image pixel value at location (x, y); $O_{X1}$, $O_{X2}$, are offsets in terms of number of pixels in horizontal direction; $O_{Y1}$, $O_{Y2}$, are offsets in terms of number of pixels in vertical direction.

The different areas are grouped together based upon the criterion that SAD/MSE (or alike) among them is less than the define threshold value.

Figure 16:
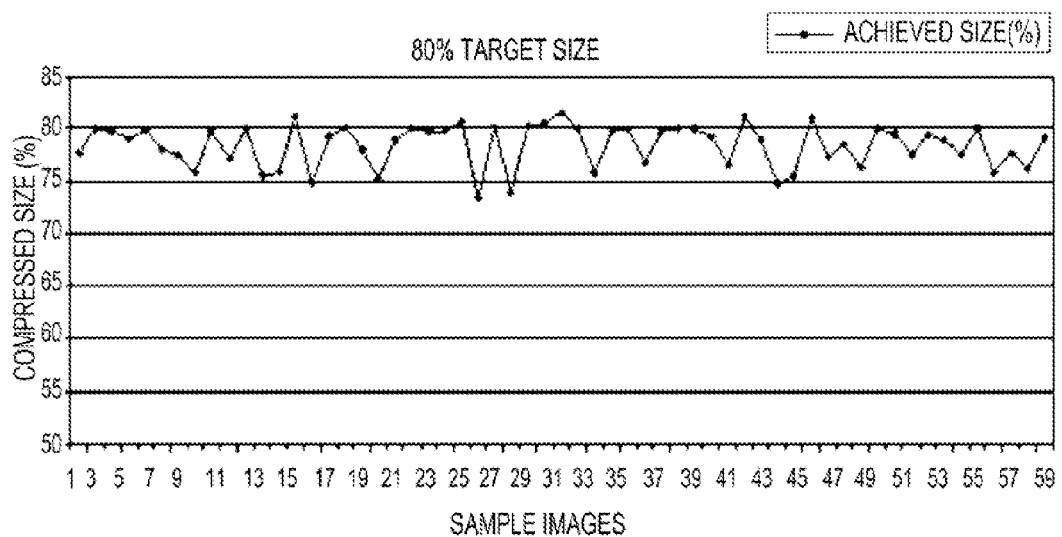
FIG. 16 illustrates a resultant file size for set of images for which desired file size is 80% of the original image file size, according to an embodiment of the present invention.

FIG. 16 illustrates a resultant file size for a set of images for which desired file size is 80% of the original image file size, according to an embodiment of the present invention. FIG. 16 illustrates a simulation result on a set of image samples that were subjected to a compression ratio of 80%. Most of the image samples were compressed to the target size of 80%. The compression ratio achieved is around 80% of the actual size.

Figure 17:
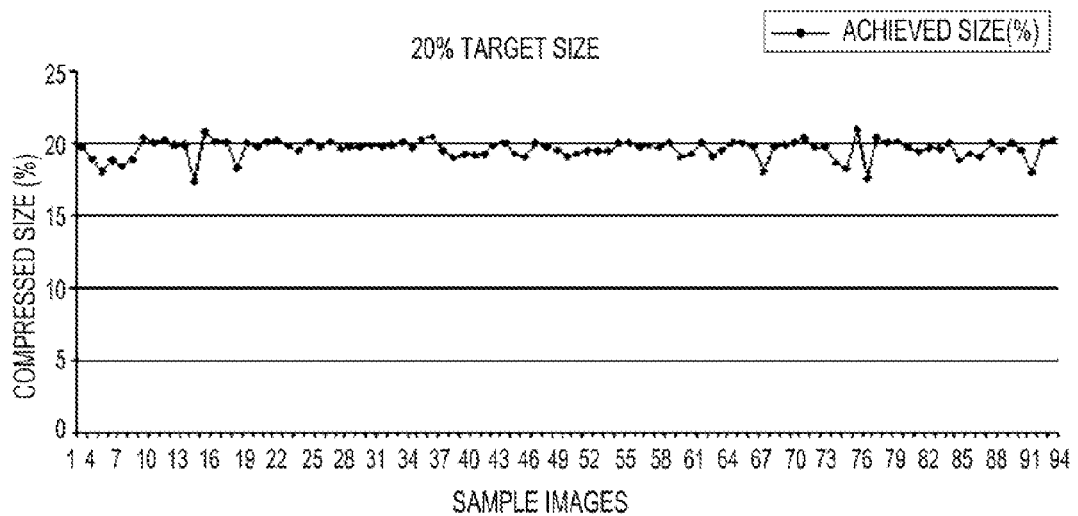
FIG. 17 illustrates a resultant file size for set of images for which desired file size is 20% of the original image file size, according to an embodiment of the present invention.

FIG. 17 illustrates resultant file size for set of images for which desired file size is 20% of the original image file size, according to an embodiment of the present invention. FIG. 17 illustrates a simulation result on a set of image samples that were subjected to a compression ratio of 20%. Most of the image samples were compressed to the target size of 20%. The compression ratio achieved is around 20% of the actual size.

Figure 18:
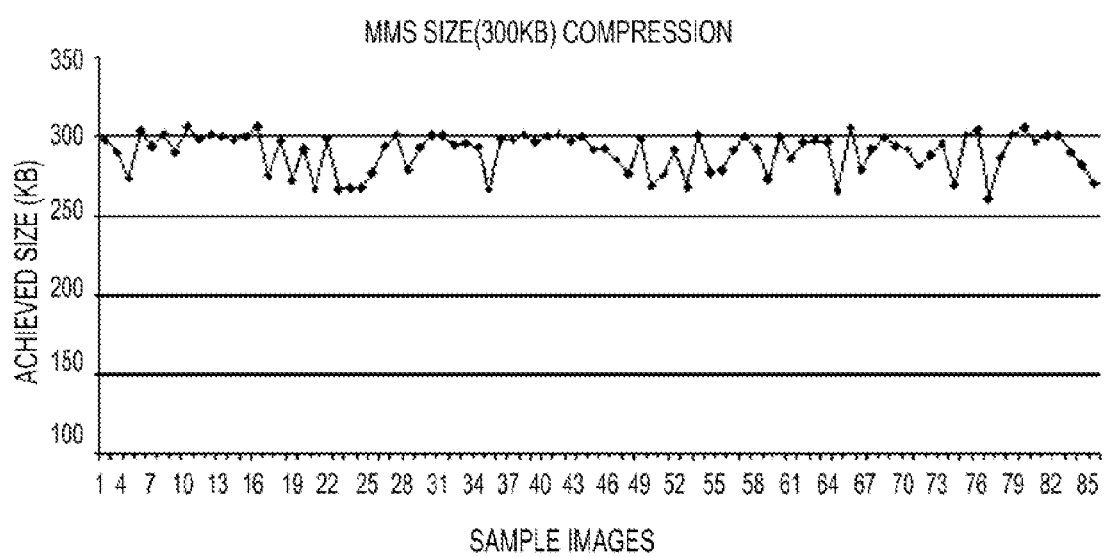
FIG. 18 illustrates a resultant file size for set of images for which desired file size is set to MMS limit (300 KB), according to an embodiment of the present invention.

FIG. 18 illustrates resultant file size for set of images for which desired file size is set to an MMS limit (300 KB), according to an embodiment of the present invention. FIG. 18 illustrates a simulation result on a set of image samples that were subjected to a compression ratio of an MMS, which is 300 KB. Most of the image samples were compressed to the target size of 300 KB. The compression achieved is around 260-300 KB.

Although the embodiments herein relate to Joint Pictures Experts Group (JPEG) compression techniques, it should be appreciated that reference to JPEG compression technique is only an example, and therefore, any other compression technique falls under the scope of the invention.

The embodiments disclosed herein are implemented through at least one software program running on at least one hardware device and performing network management functions to control the network elements. The network elements shown in FIGS. 1, 6, 7, 8, 9, 12 and 13 include blocks which are at least one of a hardware device, or a combination of hardware device and software module.

The embodiment disclosed herein provide methods and systems that enable customization of an application to enhance user experience on a computing device by having at least one resident client entity negotiate with at least one client execution entity or a server on aspects of the application that are customized. Therefore, it is understood that the scope of the protection is extended to such a program and in addition to a computer readable means having a message therein, such computer readable storage means containing program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device is any type of portable device that is programmed. The device may also include means such as hardware means including an Application-Specific Integrated Circuit (ASIC), or a combination of hardware and software means, such as an ASIC and a Field-Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

While the present invention has been shown and described with reference to certain embodiments thereof, it will be understood by those skilled in the art that various changes in form and details is made therein without departing from the spirit and scope of the present invention as defined by the appended claims. Therefore, several modifications are possible without departing from the gist of the present invention as defined by the appended claims. It should be understood that the modifications remain within the technical ideas and overviews of the invention.

I claim:

1. A method of compressing an image, the method comprising:
   grouping member entities of the image into a plurality of groups based on each image features, each of the plurality of groups including member entities sharing common features;
   selecting at least one group representative from at least one of the plurality of groups;
   estimating final control parameters for each of the group representatives in an iterative manner; and
   compressing the image based on the estimated final control parameters,
   wherein estimating the final control parameters comprises:
      estimating a resulting file size of the image;
      comparing the estimated file size with a pre-defined minimum file size; and
      computing the final control parameters if the estimated file size is less than or equal to the minimum file size.

2. The method as claimed in claim 1, wherein the member entities include a Minimum Coded Unit (MCU).

3. The method as claimed in claim 1, wherein grouping the member entities includes:
   selecting a member entity in a pre-specified order;
   determining whether the selected member entity matches a group from a plurality of groups comprising of the plurality of groups by determining whether the selected member entity matches $MCU_j \in G_m$ iff $\{F_i\}_j = \{F_i\}_m$, $\forall i$,
   where $MCU_j$ represents the $j^{th}$ MCU under consideration, $G_m$ is the $m^{th}$ group, "i" represents the feature element, $\{F_i\}_j$ represents the set of feature elements identified for $j^{th}$ MCU, $\{F_i\}_m$ represents the set of feature elements of $m^{th}$ group;
   moving the selected member entity to the group, if the selected member entity matches the group; and
   increasing the weight of the group.

4. The method as claimed in claim 1, wherein grouping the member entities is based on similarity criteria, and the similarity criteria is at least one of a Least Mean Square Error, a sum of Absolute Difference, an encoded length, and a Discrete Cosine Transform (DCT) coefficient distribution.

5. The method as claimed in claim 1, wherein estimating the final control parameters comprises:
   if the estimated file size is greater than the minimum file size:
   computing a down-size factor;
   computing a new desired image size; and
   estimating the final control parameters based on the new desired image size.

6. The method as claimed in claim 5, wherein computing the down-size factor comprises:
   determining whether the estimated file size is less than or equal to a product of the pre-defined minimum file size and compression gain factor corresponding to a probable downsize factor from a set of probable downsize factors; and
   selecting a least among the probable downsize factors,
   wherein the estimated file size is less than or equal to product of the pre-defined minimum file size and the compression gain factor corresponding to the least probable downsize factor.

7. The method as claimed in claim 1, wherein compressing the image includes:
   decoding all member entities using inverse Variable Length Code (VLC) to obtain Discrete Cosine Transform (DCT) coefficients;
   rescaling a magnitude of the DCT coefficients based on the final control parameters and initial control parameters;
   encoding the rescaled DCT coefficients using the VLC encoding; and
   compressing the image using the encoded rescaled DCT coefficients.

8. The method as claimed in claim 1, wherein the final control parameters include one of a quantization table and a quality Factor.

9. The method as claimed in claim 1, wherein compressing the image includes:
   converting the image into a raw format;
   decoding the converted image with a pre-computed resize factor; and
   encoding the decoded image with the estimated final control parameters.

10. The method as claimed in claim 1, wherein compressing the image includes:
   decoding the image in transform domain;
   resizing the decoded image in a transform domain, based on the resize parameters;
   rescaling coefficients of the resized image based on the estimated final control parameters; and
   encoding the rescaled image.

11. An apparatus for compressing an image, the apparatus comprising:
- a grouping unit for grouping member entities of the image into a plurality of groups based on each image features, each of the plurality of groups including member entities sharing common features;
- an estimation unit for selecting at least one group representative from at least one of the plurality of groups and estimating final control parameters for each of the group representatives in an iterative manner; and
- a conversion unit for compressing the image based on the estimated final control parameters,
- wherein the estimation unit estimates a resulting file size of the image, compares the estimated file size with a pre-defined minimum file size, and computes the final control parameters if the estimated file size is less than or equal to the minimum file size.

12. The apparatus as claimed in claim 11, wherein the member entities include a Minimum Coded Unit (MCU).

13. The apparatus as claimed in claim 11, wherein the grouping unit selects a member entity in a pre-specified order, determines whether the selected member entity matches a group from a plurality of groups comprising of the plurality of groups by determining whether the selected member entity matches $MCU_j \epsilon G_m \text{iff} \{F_i\}_j = \{F_i\}_m$, $\forall i$, where $MCU_j$ represents the $j^{th}$ MCU under consideration, $G_m$ is the $m^{th}$ group, "i" represents the $i^{th}$ feature element, $\{F_i\}_j$ represents the set of feature elements identified for $j^{th}$ MCU, $\{F_i\}_m$ represents the set of feature elements of $m^{th}$ group, moves the selected member entity to the group if the selected member entity matches the group, and increases the weight of the group.

14. The apparatus as claimed in claim 11, wherein the grouping unit groups the member entities based on similarity criteria, and the similarity criteria is at least one of a Least Mean Square Error, a sum of Absolute Difference, an encoded length, and a Discrete Cosine Transform (DCT) coefficient distribution.

15. The apparatus as claimed in claim 11, wherein the estimation unit, if the estimated file size is greater than the minimum file size, computes a down-size factor, computes a new desired image size, and estimates the final control parameters based on the new desired image size.

16. The apparatus as claimed in claim 15, wherein the estimation unit determines whether the estimated file size is less than or equal to a product of the pre-defined minimum file size and compression gain factor corresponding to a probable downsize factor from a set of probable downsize factors and selects a least among the probable downsize factors, wherein the estimated file size is less than or equal to product of the pre-defined minimum file size and the compression gain factor corresponding to the least probable downsize factor.

17. The apparatus as claimed in claim 11, wherein the conversion unit decodes all member entities using inverse Variable Length Code (VLC) to obtain Discrete Cosine Transform (DCT) coefficients, rescales a magnitude of the DCT coefficients based on the final control parameters and initial control parameters, encodes the resealed DCT coefficients using the VLC encoding, and compresses the image using the encoded resealed DCT coefficients.

18. The apparatus as claimed in claim 11, wherein the final control parameters include one of a quantization table and a quality Factor.

19. The apparatus as claimed in claim 11, further comprising:
- a resize factor estimation unit for computing a resize factor required for achieving a desired file size; and
- a resize and conversion unit for converting the image into a raw format, decoding the converted image with a pre-computed resize factor, and encoding the decoded image with the estimated final control parameters.

20. The apparatus as claimed in claim 19, wherein the resize and conversion unit decodes the image in transform domain, resizes the decoded image in a transform domain, based on the pre-computed resize parameters, rescales coefficients of the resized image based on the estimated final control parameters, and encodes the rescaled image.

* * * * *